US010485039B2

United States Patent
Hu et al.

(10) Patent No.: US 10,485,039 B2
(45) Date of Patent: Nov. 19, 2019

(54) DEVICES AND METHODS FOR D2D COMMUNICATION

(71) Applicant: HUAWEI TECHNOLOGIES CO., LTD., Shenzhen, Guangdong (CN)

(72) Inventors: Liang Hu, Shenzhen (CN); Chan Zhou, Munich (DE); Markus Martin Dillinger, Munich (DE)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/862,920

(22) Filed: Jan. 5, 2018

(65) Prior Publication Data
US 2018/0192462 A1 Jul. 5, 2018

Related U.S. Application Data

(63) Continuation of application No. PCT/EP2015/065374, filed on Jul. 6, 2015.

(51) Int. Cl.
*H04W 76/14* (2018.01)
*H04W 8/00* (2009.01)
(Continued)

(52) U.S. Cl.
CPC ........... *H04W 76/14* (2018.02); *H04W 8/005* (2013.01); *H04W 76/23* (2018.02); *H04W 88/04* (2013.01);
(Continued)

(58) Field of Classification Search
CPC ..... H04W 76/14; H04W 76/23; H04W 8/005; H04W 88/04; H04W 92/18
See application file for complete search history.

(56) References Cited

U.S. PATENT DOCUMENTS

2014/0133332 A1 5/2014 Lee
2014/0199969 A1 7/2014 Johnsson et al.
(Continued)

FOREIGN PATENT DOCUMENTS

EP 2665325 11/2013
WO WO2014047907 4/2014
(Continued)

OTHER PUBLICATIONS

International Search Report dated Apr. 18, 2016 in corresponding International Patent Application No. PCT/EP2015/065374.
(Continued)

*Primary Examiner* — Ronald B Abelson
(74) *Attorney, Agent, or Firm* — Womble Bond Dickinson (US) LLP (57) ABSTRACT

The application relates to a communication device configured to perform a device to device communication with a plurality of further communication devices using a second frequency band, wherein the communication device is configured to receive a control message from a further communication device of the plurality of communication devices, the control message indicating that the further communication device is within a coverage area of a cellular communication network; and wherein the communication device is further configured to, upon reception of said control message, start listening for messages from further communication devices of the plurality of communication devices using a first frequency band.

15 Claims, 8 Drawing Sheets

(51) Int. Cl.
    H04W 92/18      (2009.01)
    H04W 76/23      (2018.01)
    H04W 88/04      (2009.01)
    H04W 72/04      (2009.01)
    H04W 84/18      (2009.01)

(52) U.S. Cl.
    CPC ........ *H04W 92/18* (2013.01); *H04W 72/0406* (2013.01); *H04W 84/18* (2013.01)

(56) References Cited

U.S. PATENT DOCUMENTS

| | | |
|---|---|---|
| 2014/0204847 A1 | 7/2014 | Belleschi et al. |
| 2017/0251486 A1 | 8/2017 | Hu et al. |

FOREIGN PATENT DOCUMENTS

| | | |
|---|---|---|
| WO | WO2014054990 | 4/2014 |
| WO | WO2014062035 | 4/2014 |
| WO | WO2015003365 | 1/2015 |

OTHER PUBLICATIONS

Lenovo, *PD2DSCH design and content*, 3GPP TSG RAN WG1 #78bis, R1-143945, Ljubljana, Slovenia, Oct. 6-10, 2014, XP50869613, pp. 1-3.

Ericsson, *On Metric and Procedures for In/Out of NW coverage detection for D2D*, 3GPP TSG RAN WG1 Meeting #76bis, R1-141389, Shenzhen, China, Mar. 31-Apr. 4, 2014, XP50813562 (6 pp.).

Alcatel Lucent et al., *D2D synchronization procedure*, 3GPP TSG RAN WG1 Meeting #76bis, R1-141261, Shenzhen, China, Mar. 31-Apr. 4, 2014, XP50786934, pp. 1-4.

G. Fodor et al., *Design Aspects of Network Assisted Device-to-Device Communications*, IEEE Communications Magazine, vol. 50, Issue: 3, Mar. 2012, pp. 170-177.

Doppler, K. et al. *Device-to-Device Communication as an Underlay to LTE-Advanced Networks*, IEEE Communications Magazine, 47(12), Dec. 2009, pp. 42-49.

3GPP TR 36.843 V12.0.1 (Mar. 2014), *3rd Generation Partnership Project; Technical Specification Group Radio Access Network; Study on LTE Device to Device Proximity Services; Radio Aspects (Release 12)*, pp. 1-50.

Jiang, D. et al., *IEEE 802.11p: Towards an International Standard for Wireless Access in Vehicular Environments*, IEEE Vehicular Technology Conference, 2008, pp. 2036-2040.

Mangel, T. et al., *A Comparison of UMTS and LTE for Vehicular Safety Communication at Intersections*, IEEE VNC Conference, 2010, pp. 293-300.

Kim, S.-W. et al., *Multivehicle Cooperative Driving Using Cooperative Perception: Design and Experimental Validation*, IEEE Transactions on Intelligent Transportation Systems, vol. 16, No. 2, Apr. 2015, pp. 663-680.

Gomes, P. et al., *The See-Through System: From Implementation to Test-Drive*, IEEE Vehicular Networking Conference 2012, Nov. 2012, pp. 40-47.

IEEE Std 802.11p-2010, *IEEE Standard for Information technology—Telecommunications and information exchange between systems—Local and metropolitan area networks—Specific requirements Part 11: Wireless LAN Medium Access Control(MAC) and Physical Layer(PHY) Specifications Amendment 6: Wireless Access in Vehicular Environments*, IEEE Computer Society, Jul. 15, 2010, pp. 1-35.

International Search Report, dated Apr. 18, 2016, in International Application No. PCT/EP2015/065374 (8 pp.).

Written Opinion of the International Searching Authority, dated Apr. 18, 2016, in International Application No. PCT/EP2015/065374 (16 pp.).

ETSI TS 102 637-2 V1.2.1 (Mar. 2011), *Intelligent Transport Systems (ITS); Vehicular Communications; Basic Set of Applications; Part 2: Specification of Cooperative Awareness Basic Service*, pp. 1-18.

DEVICES AND METHODS FOR D2D COMMUNICATION

CROSS-REFERENCE TO RELATED APPLICATIONS

This application is a continuation of International Application No. PCT/EP2015/065374, filed on Jul. 6, 2015, the disclosure of which is hereby incorporated by reference in its entirety.

TECHNICAL FIELD

The present application relates to devices and methods for device to device (D2D) communication. More specifically, the present application relates to devices and methods for D2D communication assisted by a cellular communication network.

BACKGROUND

In communication networks, communication resources used for communication, such as time slots, frequency channels, resource blocks and the like, usually have to be shared by a plurality of communication devices. In order to coordinate an access of the plurality of communication devices to the communication resources, medium access control (MAC) mechanisms can be applied. Common mechanisms for medium access control (MAC) are, for instance, carrier sense multiple access with collision avoidance (CSMA/CA) or carrier sense multiple access with collision detection (CSMA/CD). Data to be communicated can be embedded in a frame structure adapted to the chosen medium access control (MAC) mechanism.

In CSMA/CA, a carrier sensing scheme is used, wherein the plurality of communication devices can attempt to avoid collisions by transmitting only when the communication resource is sensed to be idle. In CSMA/CD, a carrier sensing scheme is used, wherein a device can detect collisions while transmitting data, can stop transmitting the data, and can wait for a time interval before resending the data.

Newly emerging applications, e.g. vehicle-to-X (V2X) communications using device-to-device (D2D) communications, can pose challenges with regard to providing a low latency and a high reliability within a communication network. Moreover, data having different priorities may have to be communicated within the communication network. Conventional medium access control (MAC) mechanisms in conjunction with conventional frame structures, however, are usually not capable of providing these functionalities concurrently and can suffer from a lack of flexibility and scalability.

In G. Fodor et al., "Design Aspects of Network Assisted Device-to-Device Communications", IEEE Communications Magazine, May 2011, a D2D communication network is described.

SUMMARY

It is an object of the application to provide a concept to improve the effectiveness and efficiency of a communication network.

This object is achieved by the respective subject-matter of the independent claims. Further implementation forms are apparent from the dependent claims, the description and the figures.

According to a first aspect the application relates to a communication device configured to perform a device to device communication with a plurality of further communication devices using a second (carrier) frequency band. The communication device is configured to receive using the second frequency band a control message from a further communication device of the plurality of communication devices, the control message indicating that the further communication device is within a coverage area of a cellular communication network (or in short cellular network). The communication device is further configured to, upon reception of said control message, start listening for messages from further communication devices of the plurality of communication devices using a first (carrier) frequency band, in particular by turning on a second receiver which is configured to receive in the first frequency band.

A communication device according to the first aspect of the application moving into the coverage area of a cellular network can obtain information about communication resources used by other communication devices within the coverage area of the cellular network by monitoring messages within a further frequency band. Doing so allows to efficiently share communication resources leading to fewer collisions of communication devices selecting interfering communication resources. Hence, the effectiveness and the efficiency of a communication network comprising such a communication device are improved.

In a first possible implementation form of the first aspect of the application as such the communication device is configured to stop listening for messages using the first frequency band upon not receiving said control message from any of the plurality of communication devices for a predetermined amount of time, in particular by switching of the second receiver. By stopping to monitor messages from further communication devices over the further frequency band, once the communication device has left the coverage area of the cellular communication network, processing resources of the communication device are not unnecessarily wasted. Hence, the effectiveness and the efficiency of a communication network comprising such a communication device are improved.

In a second possible implementation form of the first aspect of the application as such or the first implementation form thereof the communication device is configured to keep listening for messages using the first frequency band as long as it periodically receives the control message from at least one further communication device within the coverage area of the cellular communication network. It should be made clear that such control message does not need to be received periodically from one the same communication device. The control message could also be received from different communication devices. Doing so makes sure that, as long as the communication device is within the coverage area of the cellular network, the communication device is aware of the presence of the cellular network and the communication device can select communication resources on the basis of information received from the other communication devices over the further frequency band leading to fewer collisions of communication devices selecting interfering communication resources. Hence, the effectiveness and the efficiency of a communication network comprising such a communication device are improved.

In a third possible implementation form of the first aspect of the application as such or the first or the second implementation form thereof the communication device is configured to determine itself to be within the coverage area of the cellular communication network, wherein the communication device is configured to, upon determining itself to be within the coverage area of the cellular communication network, stop receiving (e.g. stop listening for) said control message. Doing so reduces the processing overhead of the communication device, in case it can determine by other means (e.g. based on control signals received from a base station of the cellular communication network) to be within the coverage area of the cellular communication network. Hence, the effectiveness and the efficiency of a communication network comprising such a communication device are improved.

In a fourth possible implementation form of the first aspect of the application as such or any one of the first to third implementation form thereof the communication device comprises a first receiver for the second frequency band and a second receiver for the first frequency band, wherein the communication device is configured to switch on the second receiver, upon reception of the control message, to start listening for messages from further communication devices of the plurality of communication devices using the first frequency band.

In a fifth possible implementation form of the first aspect of the application as such or any one of the first to fourth implementation form thereof the communication device is configured to, as long as it does not receive said control message, communicate with the further communication devices using a communication frame having a first control channel format, the first control channel format offering only communication resources for an ad hoc communication mode, wherein the communication device is further configured to, upon reception of said control message, communicate with the further communication devices using a communication frame having a second control channel format, the second control channel format offering communication resources for an ad hoc communication mode and a network assisted communication mode.

Such a communication frame allows supporting both the network assisted communication mode and the ad hoc communication mode of a plurality of communication devices within a communication network at the same time. By means of such a communication frame it is possible for a communication device to seamlessly switch from the network assisted communication mode to the ad hoc communication mode in case cellular network assistance is no longer available. Furthermore it can be achieved that even ad-hoc mode devices (which are currently not in a network assisted mode) don't interfere with network assisted mode devices and vice versa, as the communication frame can provide dedicated communication resources to be used by the devices depending on in what mode the devices currently are (network assisted mode or ad hoc mode). Hence, the effectiveness and efficiency of a communication network employing such a communication device are improved.

The communication frame can be embedded within a frequency division duplexing (FDD) uplink frequency band or a time division duplexing (TDD) uplink time frame of a LTE communication frame. In particular, the communication frame can be embedded within a physical uplink shared channel (PUSCH) and/or a physical uplink control channel (PUCCH).

In a sixth possible implementation form of the first aspect of the application as such or any one of the first to fifth implementation form thereof the communication device is configured to, when it is within the coverage area of the cellular communication network, use the first frequency band for cellular communication and device to device communication and, when it is within an edge region of the coverage area, further use the second frequency band for device to device communication only.

The communication device can be arranged within a vehicle or car, or can be carried by a pedestrian. Furthermore, the communication device can be arranged within a traffic infrastructure device.

The communication device can be configured to operate within a vehicle-to-X (V2X) communication network or a device-to-device (D2D) communication network. The vehicle-to-X (V2X) communication network or the device-to-device (D2D) communication network can be an IEEE 802.11p based communication network or a long term evolution (LTE) based communication network.

According to a second aspect the application relates to a communication device configured to perform a device to device communication with a plurality of further communication devices. The communication device is configured to determine itself to be within a coverage area of a cellular communication network and the communication device is configured to broadcast a control message to the further communication devices, the control message indicating that the communication device is within the coverage area of the cellular communication network.

A communication device according to the second aspect of the application can inform other communication devices near the edge of the coverage of the cellular communication network by means of the control message about the presence of the cellular communication network and, thus, prompt the other communication devices to start listening to messages about communication resources allocated with the assistance of the cellular communication network. Hence, the effectiveness and efficiency of a communication network employing such a communication device are improved.

In a first possible implementation form of the second aspect of the application as such the communication device is configured to determine itself to be within an edge region of the coverage area of the cellular communication network, wherein the communication device is configured to start broadcasting the control message upon detecting that the communication device is within the edge region of the coverage area of the cellular communication network. By broadcasting the control message only within an edge region of the cellular communication network, the signaling overhead is reduced. Hence, the effectiveness and efficiency of a communication network employing such a communication device are improved.

In a second possible implementation form of the first implementation form of the second aspect of the application the communication device is configured to perform a device to device communication with communication devices within the coverage area of the cellular communication network using a first frequency band, wherein the communication device is configured to, upon detecting that the communication device is within the edge region of the cellular communication network, start listening for messages from communication devices outside of the coverage area of the cellular communication network using a second frequency band, and wherein the communication device is configured to broadcast the control message using the second frequency band. Using a first and a second frequency band for different communication modes leads to to fewer collisions of communication devices selecting interfering communication resources. Hence, the effectiveness and the efficiency of a communication network comprising such a communication device are improved.

In a third possible implementation form of the first or the second implementation form of the second aspect of the application the communication device is configured to determine a reference signal power of a reference signal sent from the cellular communication network and the communication device is configured to, upon a determination that the determined reference signal power is smaller than a threshold, determine itself to be within the edge region of the coverage area of the cellular communication network.

In a fourth possible implementation form of any one of the first to third implementation form of the second aspect of the application the communication device is configured to broadcast the control message periodically, as long as the communication device determines itself to be within the edge region of the coverage area of the cellular communication network.

In a fifth possible implementation form of any one of the first to fourth implementation form of the second aspect of the application the communication device is configured to detect itself to be within a center region of the coverage area of the cellular communication network, and the communication device is configured to stop broadcasting the control message, upon detecting that the communication device is within the center region of the coverage area of the cellular communication network. By not broadcasting the control message within a center region of the cellular communication network, the signaling overhead is reduced. Hence, the effectiveness and efficiency of a communication network employing such a communication device are improved.

In a sixth possible implementation form of any one of the first to fifth implementation form of the second aspect of the application the communication device is configured to, when it is within the coverage area of the cellular communication network, use a first frequency band for cellular communication and device to device communication, and the communication device is configured to, when it is within the edge region of the coverage area of the cellular communication network, further use a second frequency band for device to device communication only. Using a first and a second frequency band for different communication modes leads to fewer collisions of communication devices selecting interfering communication resources. Hence, the effectiveness and the efficiency of a communication network comprising such a communication device are improved.

In a seventh possible implementation form of the second aspect of the application as such or any one of the first to sixth implementation form thereof the control message comprises at least one out of the group of: an identifier of the communication device broadcasting the control message, an indicator indicating that the communication device broadcasting the control message is within the coverage area of the cellular communication network, a selected radio resource identifier of the communication device broadcasting the control message, a synchronization signal from the communication device broadcasting the control message, and/or location information about the communication device broadcasting the control message.

The communication device can be arranged within a vehicle or car, or can be carried by a pedestrian. Furthermore, the communication device can be arranged within a traffic infrastructure device.

The communication device can be configured to operate within a vehicle-to-X (V2X) communication network or a device-to-device (D2D) communication network. The vehicle-to-X (V2X) communication network or the device-to-device (D2D) communication network can be an IEEE 802.11p based communication network or a long term evolution (LTE) based communication network.

According to a third aspect the application relates to a method of operating a communication device configured to perform a device to device communication with a plurality of further communication devices using a second (carrier) frequency band. The method comprises the steps of: receiving using the second frequency band a control message from a further communication device of the plurality of communication devices, the control message indicating that the further communication device is within a coverage area of a cellular communication network; and upon reception of the control message, start listening for messages from further communication devices of the plurality of communication devices using a first (carrier) frequency band, in particular by activating a second receiver.

The method according to the third aspect of the application can be performed, for instance, by the communication device according to the first aspect of the application. Further features of the method according to the third aspect of the application result directly from the functionality of the communication device according to the first aspect of the application.

According to a fourth aspect the application relates to a method of operating a communication device configured to perform a device to device communication with a plurality of further communication devices. The method comprises the steps of: determining itself to be within a coverage area of a cellular communication network; and broadcasting a control message to the further communication devices, the control message indicating that the communication device is within the coverage area of the cellular communication network.

The method according to the fourth aspect of the application can be performed, for instance, by the communication device according to the second aspect of the application. Further features of the method according to the fourth aspect of the application result directly from the functionality of the communication device according to the second aspect of the application.

According to a fifth aspect the application relates to a computer program comprising a program code for performing the method according to the third aspect or the method according to the fourth aspect of the application when executed on a computer.

The application can be implemented in hardware and/or software.

BRIEF DESCRIPTION OF THE DRAWINGS

Further embodiments of the application will be described with respect to the following figures, wherein.

DETAILED DESCRIPTION OF EMBODIMENTS

Figure 1:
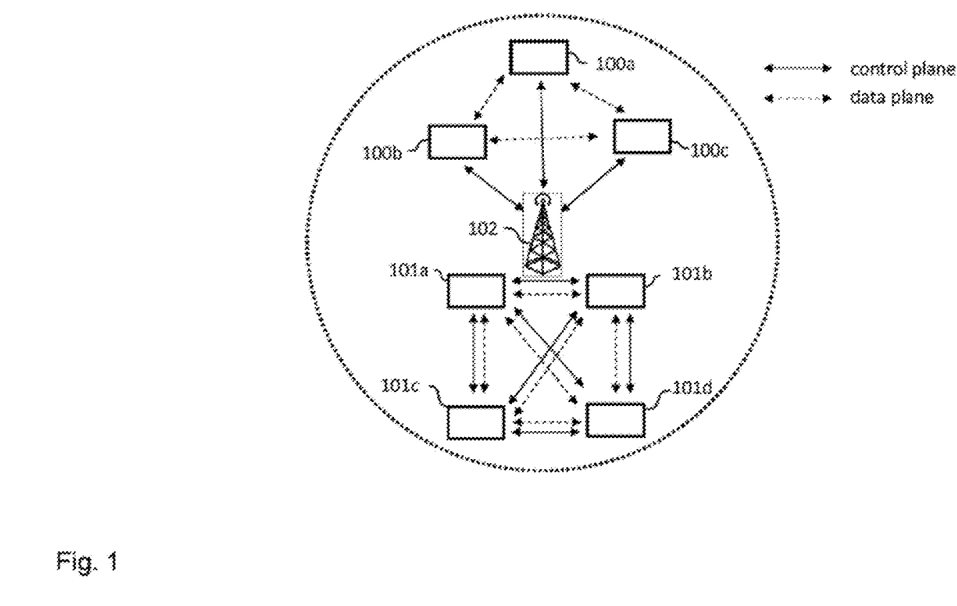
FIG. 1 shows a schematic diagram of a communication scenario including a plurality of communication devices operating in a network-assisted communication mode and in an ad-hoc communication mode according to an embodiment.

FIG. 1 shows a schematic diagram of a communication scenario including a plurality of communication devices operating in an ad-hoc communication mode and a network-assisted communication mode according to an embodiment. The upper half of FIG. 1 shows three exemplary communication devices 100a, 100b and 100c according to an embodiment operating in a network-assisted communication mode and configured to communicate with an exemplary base station 102 of a cellular network. The lower half of FIG. 1 shows four exemplary communication devices 101a, 101b, 102c and 104d according to an embodiment operating in the ad-hoc communication mode.

The communication devices 100a-c and 101a-d can be configured to operate within a vehicle-to-X (V2X) communication network or a device-to-device (D2D) communication network. The term vehicle-to-X (V2X) communications is used to cover vehicle-to-vehicle (V2V), vehicle-to-infrastructure (V2I) and vehicle-to-X (V2X) communications. The vehicle-to-X (V2X) communication network or the device-to-device (D2D) communication network can be an IEEE 802.11p based communication network or a long term evolution (LTE) based communication network.

As indicated in FIG. 1, in the network-assisted communication mode the D2D control plane and data plane can be separated in that exchange of control data between the communication devices 100a-c can be done via the cellular network represented by the base station. In the ad-hoc communication mode the D2D control plane and data plane can be the same.

Figure 2:
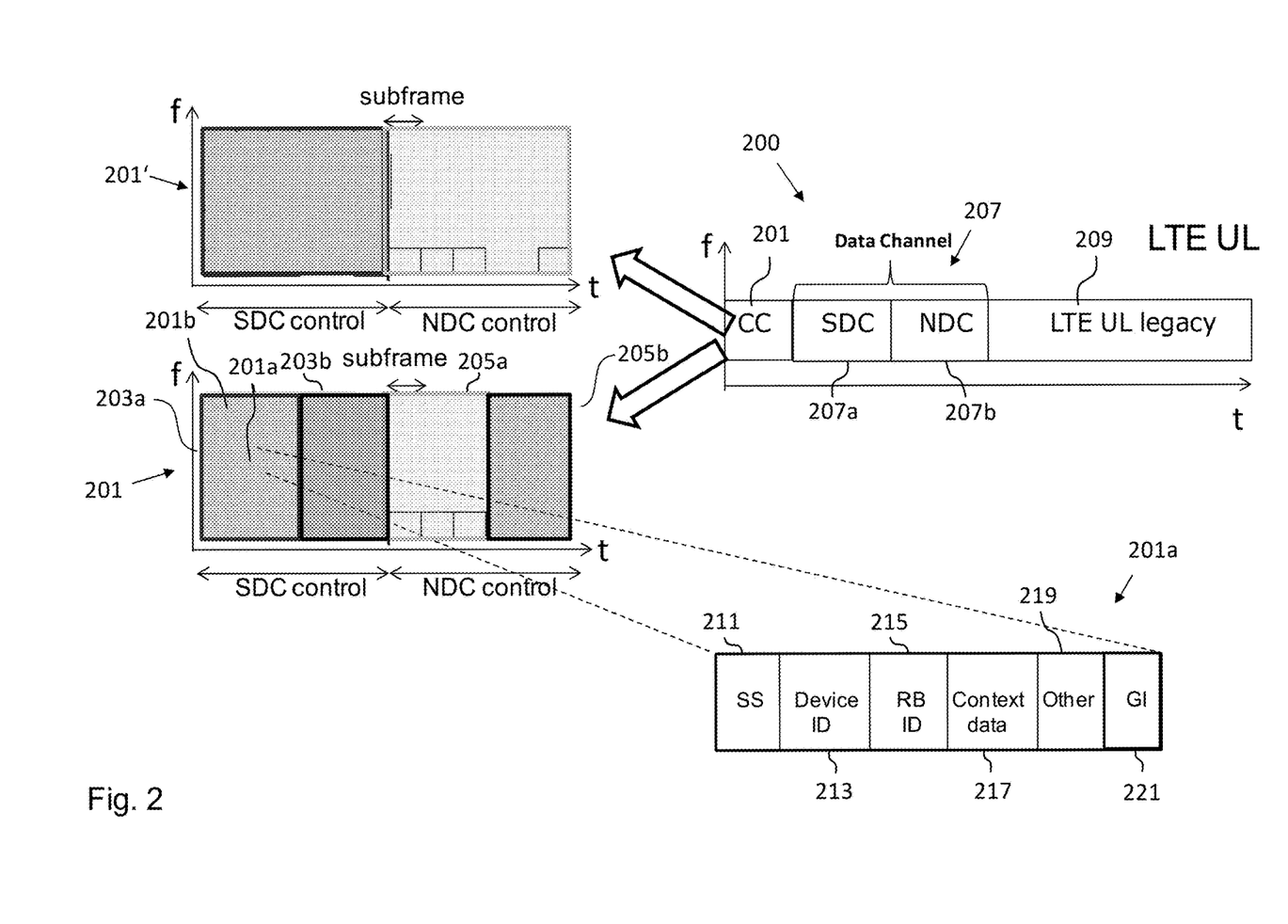
FIG. 2 shows a schematic diagram of a communication frame suitable in a communication device or method according to an embodiment.

FIG. 2 shows a schematic diagram of an embodiment of a communication frame 200 for network communication, in particular for device-to-device (D2D) network communication that can be used by the communication devices 100a-c or 101a-c. The communication frame 200 comprises a control channel 201 and a data channel 207.

In an embodiment, the communication frame 200 can be a unified medium access control (MAC) frame. In an embodiment, the communication frame 200 can be embedded within a frequency division duplexing (FDD) uplink frequency band or a time division duplexing (TDD) uplink time frame of a LTE communication frame. In an embodiment, the communication frame 200 can be embedded within a physical uplink shared channel (PUSCH) and/or a physical uplink control channel (PUCCH) of a LTE communication frame.

Typically, control data provided by a communication resource within the control channel 201 of the communication frame 200 defines communication resources within the data channel 207 communicating specific payload data. In other words, the control data within the control channel 201 of the communication frame provides a mapping to the payload data within the data channel 207 of the communication frame 200.

The control channel 201 can enable a fine-tuned synchronization, a direct neighboring device discovery, a paging, a communication resource reservation for data and can be used for exchanging communication device context information, e.g. a geographic position of a communication device.

The control channel 201 can have a permanent set of communication resources, e.g. used for a L1/L2 control among communication devices. The control channel 201 length or size can be configurable, e.g. based on a communication device density. A multi-user control channel access protocol can be used.

The data channel 207 can comprise a high priority portion 207a (referred to in FIG. 2 as "Safety Data Channel" or short "SDC") and a low priority portion 207b (referred to in FIG. 2 as "Non-Safety Data Channel" or short "NDC").

The high priority portion 207a of the data channel 207, i.e. the SDC portion, can be reserved for high priority data, e.g. hard quality of service (QoS) safety vehicle-to-X (V2X) traffic data, with high priority. It can support mixed data or traffic types, e.g. semi-persistent communication resource patterns for cooperative awareness message (CAM) periodical messages, and/or an on-demand communication resource reservation for context-rich mission-critical data (CMD). A multi-user high priority data channel communication resource reservation protocol can be used.

The low priority portion 207b of the data channel 207, i.e. the NDC portion, can serve low priority data, e.g. soft quality of service (QoS) vehicle-to-X (V2X) traffic data, with low priority, e.g. traffic efficiency application data. It can give up priority for high priority data, e.g. hard quality of service (QoS) safety traffic data. A multi-user communication resource coordination in the low priority portion 207b, i.e. the NDC portion, can be based on an on-demand reservation scheme or a carrier sense multiple access (CSMA) type reservation scheme.

The communication resources of the high priority portion 207a of the data channel 207, i.e. the SDC portion, and the low priority portion 207b of the data channel 207, i.e. the NDC portion, can be multiplexed, for instance, in the frequency domain and/or the time domain.

In the embodiment shown in FIG. 2 the communication frame 200 is embedded within an uplink LTE communication frame that can further comprise an uplink LTE communication frame portion 209. Thus, an allocation of connected communication resources within a long term evolution (LTE) structure is possible. In a downlink communication portion, communication resources may not be allocated connectedly since control frames may appear every 1 ms. A concurrent downlink (DL) receive can be achieved.

In an embodiment, when using a long term evolution (LTE) frequency division duplexing (FDD) carrier, communications can be performed within a physical uplink shared channel (PUSCH). Thus, after communication of the communication frame 200, normal long term evolution (LTE) communications can take place.

As can be taken from the more detailed view of the communication frame 200 shown on the bottom left hand side of FIG. 2, the control channel 201 of the communication frame 200 comprises in an embodiment a high priority control channel part ("SDC control") and a low priority control channel part ("NDC control"). In the embodiment shown in FIG. 2, the high priority part of the control channel 201 is divided into an ad-hoc communication mode control channel portion 203a and a network assisted communication mode control channel portion 203b. Likewise, in the embodiment shown in FIG. 2, the low priority part of the control channel 201 is divided into an ad-hoc communication mode control channel portion 205a and a network assisted communication mode control channel portion 205b.

FIG. 2 shows two exemplary communication resources, in particular resource blocks, 201a and 201b within the ad-hoc communication mode control channel portion 203a of the high priority part of the control channel 201. As can be taken from the more detailed view shown on the bottom right hand side of FIG. 2, the exemplary communication resource, in particular resource block, 201a comprises a plurality of data fields, such as a synchronization sequence or signal (SS) 211, a device ID 213, a resource block ID 215, context data 217, such as information about the location of a device, a field for other data 219 and a guard interval (GI) 221.

The synchronization sequence or signal (SS) 211, for instance, allows synchronizing communication devices operating in the ad-hoc communication mode, such as the communication devices 101a-d shown in FIG. 1.

The top left hand side of FIG. 2 shows an embodiment of a control channel 201', which can be used when no network assistance is available. In this case the control channel 201' can comprise only a high priority part (referred to as "SDC control" in FIG. 2) and a low priority part (referred to as "NDC control" in FIG. 2).

In an embodiment, the communication frame 200 can be structured depending on a mode from a set of modes, wherein the set of modes comprises the ad-hoc communication mode and the network-assisted communication mode. In an embodiment, the communication frame 200 can be switched between the ad-hoc communication mode and the network-assisted communication mode and vice versa, for instance, according to cellular network coverage and/or whether a communication device is in an idle mode or a connected mode with respect to a cellular network. Thus, a decision criterion for automatic mode switching can be provided.

Figure 3:
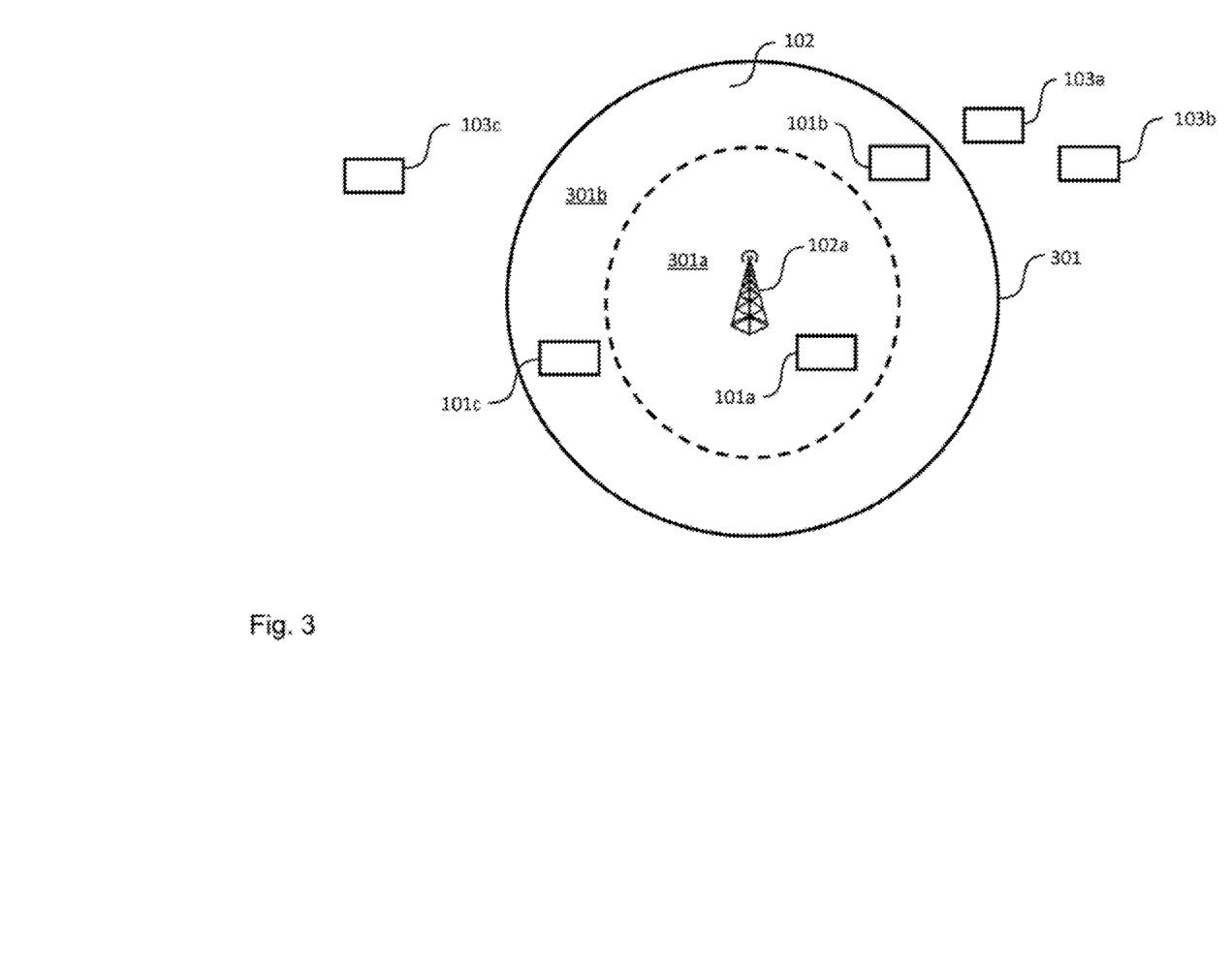
FIG. 3 shows a schematic diagram of a communication scenario including a plurality of communication devices inside and outside of a coverage area of a cellular network according to an embodiment.

FIG. 3 shows a schematic diagram of a communication scenario including a plurality of communication devices inside and outside of a coverage area 301 of the cellular communication network 102 according to an embodiment. The cellular communication network is provided by means of base stations 102a. Although in the example in FIG. 3 only one base station 102a is shown, it is clear for a person skilled in the art that a cellular communication network is typically spanned by a plurality of base stations 102a. The coverage area 301 of the cellular communication network 102 is divided into a center region 301a in the vicinity of the base station 102a establishing the cellular communication network 102 and an edge region 301b outside of the center region 301a of the cellular communication network 102, i.e. in the vicinity of the edge of the coverage area 301. In the example shown in FIG. 3 the communication device 101a is within the center region 301a of the coverage area 301 of the cellular communication network 102, the communication devices 101b and 101c are within the edge region 301b of the coverage area 301 of the cellular communication network 102 and the communication devices 103a-c are outside of the coverage area 301 of the cellular communication network 102. In other words, the communication devices 103a-c cannot communicate directly with the base station 102a (or any other base station) of the cellular communication network 102. In an embodiment, the center region 301a and the edge 301b of the coverage area 301 of the cellular communication network 102 can be defined by using a signal strength threshold for the signal strength of the cellular communication network 102.

Figure 4:
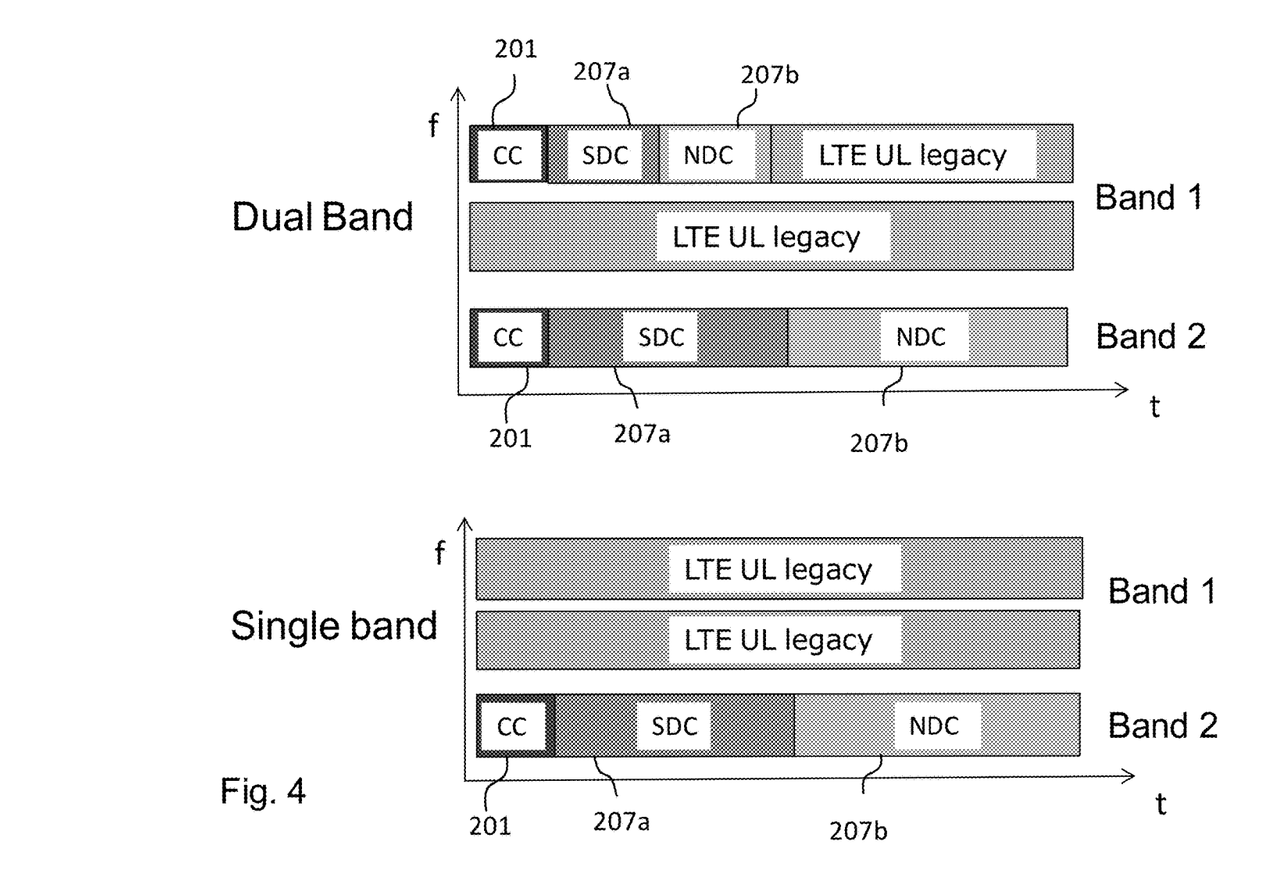
FIG. 4 shows a schematic diagram illustrating different frequency bands that can be used by a communication device according to an embodiment.

In an embodiment, the communication devices within the coverage area 301 of the cellular communication network 102, i.e. the exemplary communication devices 101a-c shown in FIG. 3, and the communication devices outside of the coverage area 301 of the cellular communication network 102, i.e. the exemplary communication devices 103a-c shown in FIG. 3, can operate using communication frames within different frequency bands. In an embodiment, the communication devices within the coverage area 301 of the cellular communication network 102, i.e. the exemplary communication devices 101a-c shown in FIG. 3, can use part of the cellular UL PUSCH communication resources as shown in FIG. 4. In this case, the communication frame can be embedded in the legacy LTE PUSCH communication frame, including a control channel 201 and a data channel 207 with a high priority portion 207a and a low priority portion 207b, as already described above in the context of FIG. 2.

In an alternative embodiment, both the communication devices within the coverage area 301 of the cellular communication network 102, i.e. the exemplary communication devices 101a-c shown in FIG. 3, and the communication devices outside of the coverage area 301 of the cellular communication network 102, i.e. the exemplary communication devices 103a-c shown in FIG. 3, can operate using the same frequency band for D2D communication. In other words, the D2D communication can take place in a dedicated band using a dedicated D2D communication frame, as shown also in FIG. 4. The cellular communication network 102, which can only be utilized by the communication devices within the coverage area 301 of the cellular communication network 102, i.e. the exemplary communication devices 101a-c shown in FIG. 3, can be deployed on Band 1, as schematically illustrated in FIG. 4.

Figure 5:
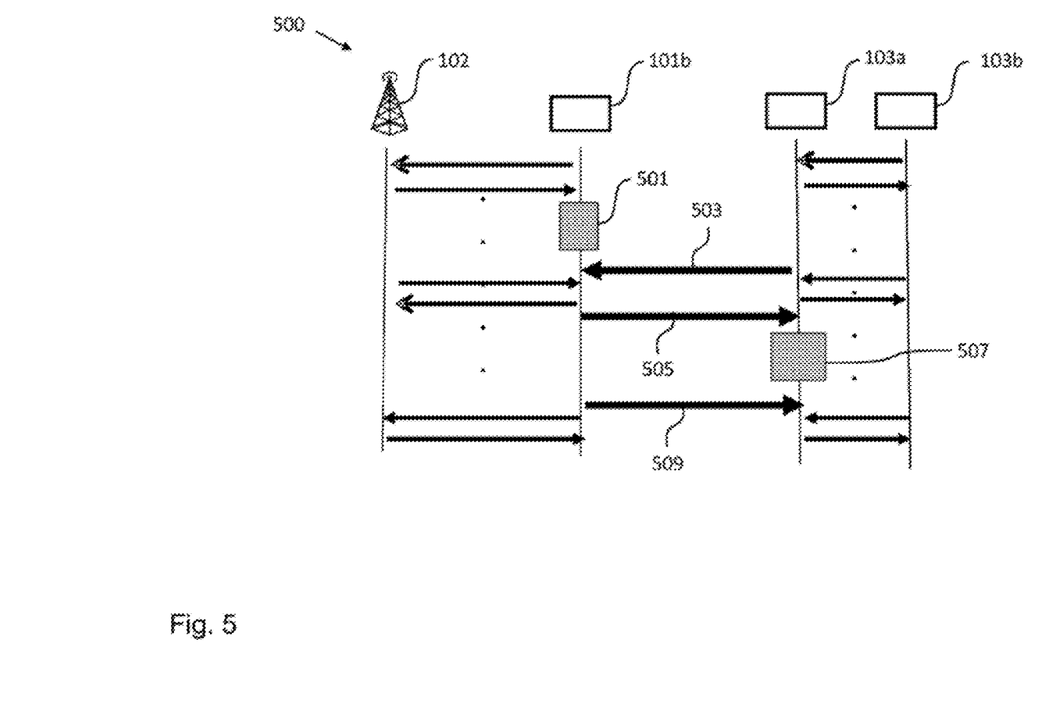
FIG. 5 shows a schematic diagram illustrating a communication process between different communication devices according to an embodiment.

FIG. 5 shows a schematic diagram illustrating the communication flow 500 between a communication device within the coverage area 301 of the cellular communication network 102, e.g. the communication device 101b shown in FIG. 3, and a communication device approaching the coverage area 301 of the cellular communication network 102, e.g. the communication device 103a shown in FIG. 3, for the case described above that the communication devices within the coverage area 301 of the cellular communication network 102 and the communication devices outside of the coverage area 301 of the cellular communication network 102 perform D2D communications using different frequency bands e.g. Band 1 (first frequency band) and Band 2 (second frequency band) from the upper half of FIG. 4.

In a step 501 of the communication process 500 shown in FIG. 5 the communication device 101b determines itself to be within the edge region 301b of the coverage area 301 of the cellular communication network 102. In an embodiment, the communication device 101b is configured to make this determination on the basis of a (e.g. legacy LTE) signal strength provided by the cellular communication network 102 or on the basis of interacting with the network.

In a step 503 the communication device 101b activates a second receiver in order to start listening for communication messages over a second frequency band, while continuing to listen for communication messages from other communication devices within the coverage area 301 of the cellular communication network 102 over a first frequency band using a first receiver.

In a step 505 the communication device 101b periodically broadcasts a control message to communication devices outside of the coverage area 301 of the cellular communication network 102 using the second frequency band, in particular using the control channel of a communication frame operating in the second frequency band. In an embodiment, the control message broadcasted by the communication device 101b can comprise at least one of the following data elements: an identifier of the communication device 101b, an indicator indicating that the communication device 101b is within the coverage area 301 of the cellular communication network 102, a communication resource identifier identifying the communication resource(s) selected by the communication device 101b, a synchronization signal from the communication device 101b, and/or location information about the communication device 101b.

When in step 505 the communication device 103a outside of the coverage area 301 of the cellular communication network 102, but within the broadcasting region of the communication device 101b receives such a control message from the communication device 101b the communications device 103a determines itself to be in the vicinity of the outer edge of the coverage area 301 of the cellular communication network 102. In response thereto, in a step 507 the communication device 103a starts listening for communication messages within the first frequency band (schematically indicated as step 509 in FIG. 5), in particular by activating its second receiver, while continuing to listen for communication messages over the second frequency band. The communication device 103a is now also aware about D2D communications performed on the first frequency band (e.g. by communications devices within in the coverage range of the cellular communication network 102).

Figure 6:
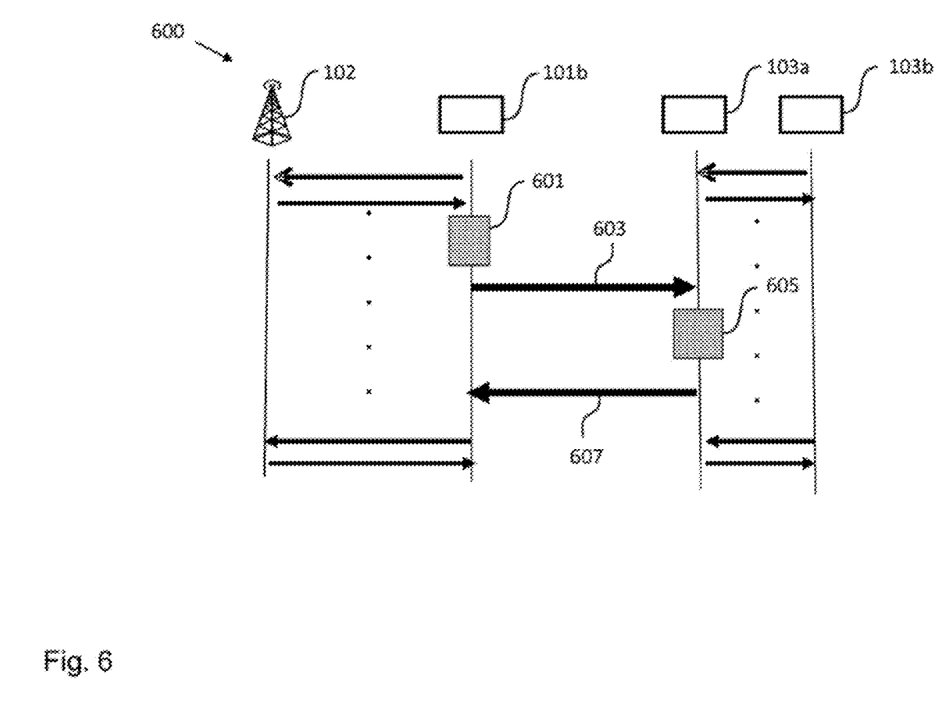
FIG. 6 shows a schematic diagram illustrating a communication process between different communication devices according to an embodiment.

FIG. 6 shows a schematic diagram illustrating the communication flow 600 between a communication device within the coverage area 301 of the cellular communication network 102, e.g. the communication device 101b shown in FIG. 3, and a communication device approaching the coverage area 301 of the cellular communication network 102, e.g. the communication device 103a shown in FIG. 3, for the case described above that the communication devices within the coverage area 301 of the cellular communication network 102 and the communication devices outside of the coverage area 301 of the cellular communication network 102 perform D2D communications using the same frequency band e.g. Band 2 (the second frequency band) from the lower half of FIG. 4.

In a step 601 of the communication process 600 shown in FIG. 6 the communication device 101b determines itself to be within the edge region 301b of the coverage area 301 of the cellular communication network 102. In an embodiment, the communication device 101b is configured to make this determination on the basis of a (e.g. legacy LTE) signal strength provided by the cellular communication network 102 or on the basis of interacting with the network.

In a step 603 the communication device 101b periodically broadcasts a control message to communication devices outside of the coverage area 301 of the cellular communication network 102 using the second frequency band, in particular using the control channel of a communication frame operating in the second frequency band. In an embodiment, the control message broadcasted by the communication device 101b can comprise at least one of the following data elements: an identifier of the communication device 101b, an indicator indicating that the communication device 101b is within the coverage area 301 of the cellular communication network 102, a communication resource identifier identifying the communication resource(s) selected by the communication device 101b, a synchronization signal from the communication device 101b, and/or location information about the communication device 101b.

When in step 603 the communication device 103a outside of the coverage area 301 of the cellular communication network 102, but within the broadcasting region of the communication device 101b receives such a control message from the communication device 101b and, the communication device 103a determines itself to be in the vicinity of the outer edge of the coverage area 301 of the cellular communication network 102. In response thereto, in steps 605 and 607 the communication device 103a only uses the ad-hoc communication mode control channel portion of the control channel of the communication frame, such as the ad-hoc communication mode control channel portion 205a of the control channel 201 of the communication frame 200 shown in FIG. 2, defined by the control message received from the communication device 101b within the edge region 301b of the coverage area 301 of the cellular communication network 102. In an embodiment, the communication device 103a continues to receive over the entire control channel of the communication frame, including the ad-hoc communication mode control channel portion 205a and the network assisted communication mode control channel portion 205b. Hence, the communication device 103a is now aware of D2D communications of devices in the ad-hoc communication mode and the network-assisted communication mode. Hence, resource collision between communication devices in different communications modes can be avoided.

Figure 7:
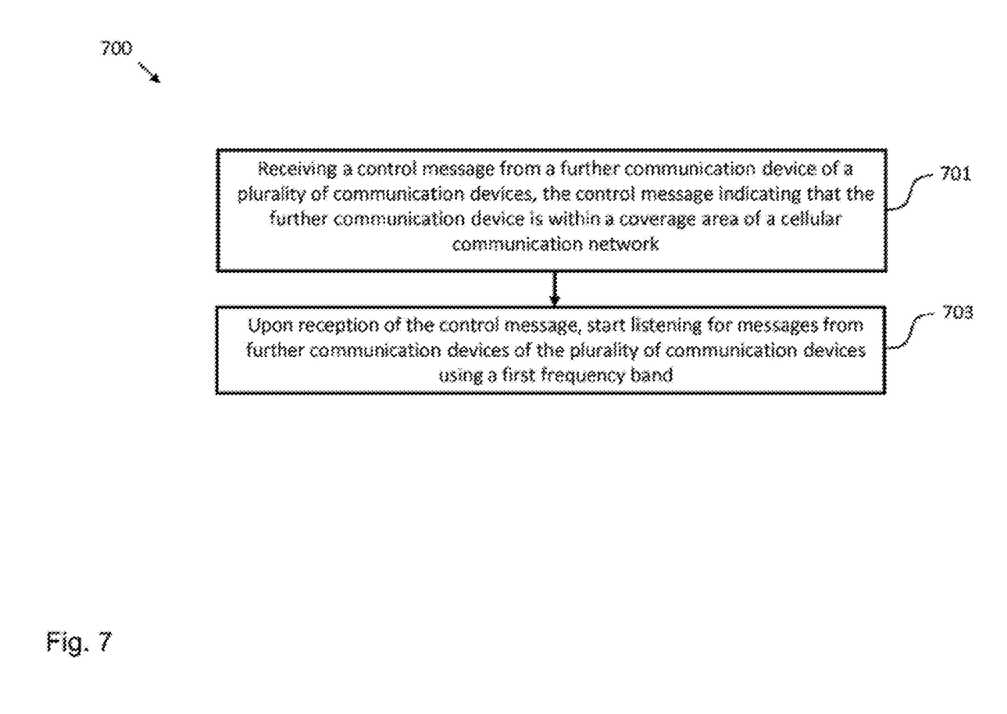
FIG. 7 shows a flow diagram illustrating a method of operating a communication device according to an embodiment.

FIG. 7 shows a flow diagram illustrating a method 700 of operating a communication device, such as one of the communication devices 103a-c, configured to perform a D2D communication with a plurality of further communication devices, such as the communication devices 101a-c, 103a-c, using a second frequency band. The method 700 comprises the following steps.

A first step 701 of receiving a control message from a further communication device of the plurality of communication devices, such as one of the communication devices 101a-c, the control message indicating that the further communication device, such as one of the communication devices 101a-c, is within a coverage area 301 of a cellular communication network (represented by the base station 102). A second step 703, in response to the reception of the control message, of starting to listen for messages from further communication devices of the plurality of communication devices, such as the communication devices 101a-c, 103a-c, using a first frequency band.

Figure 8:
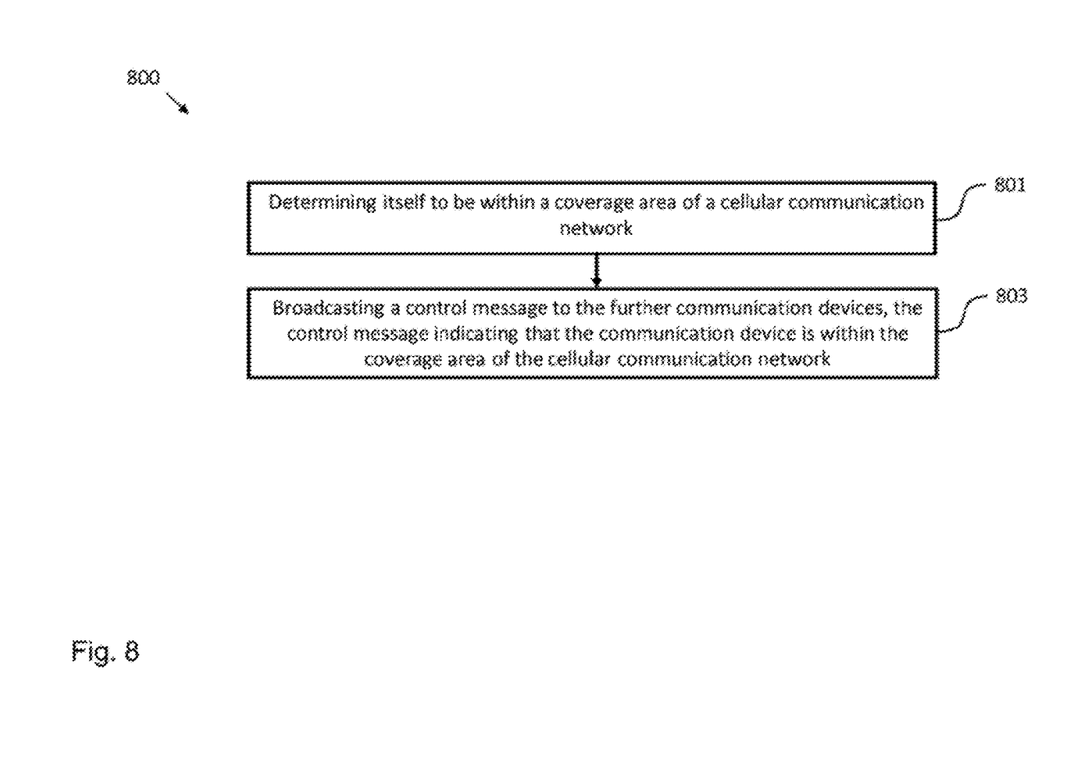
FIG. 8 shows a flow diagram illustrating a method of operating a communication device according to an embodiment.

FIG. 8 shows a flow diagram illustrating a method 800 of operating a communication device, such as one of the communication devices 101a-c, configured to perform a D2D communication with a plurality of further communication devices. The method 800 comprises the following steps.

A first step 801 of determining itself (i.e. the communication device) to be within a coverage area 301 of a cellular communication network (provided by at least one base station 102a). A second step 803 of broadcasting a control message to the further communication devices, the control message indicating that the communication device is within the coverage area 301 of the cellular communication network 102.

Embodiments of the invention may be implemented in a computer program for running on a computer system, at least including code portions for performing steps of a method according to the application when run on a programmable apparatus, such as a computer system or enabling a programmable apparatus to perform functions of a device or system according to the application. A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

Although the application is described with reference to specific features, implementation forms, and embodiments, it is evident that various modifications and combinations can be made thereto without departing from the spirit and scope of the application. The description and the figures are, accordingly, to be regarded simply as an illustration of the application as defined by the appended claims, and are contemplated to cover any and all modifications, variations, combinations, or equivalents that fall within the scope of the application.

The invention claimed is:

1. A communication device outside a coverage area of a cellular communication network, configured to perform a device to device communication with a plurality of further communication devices using a second frequency band,
   wherein the communication device is configured to receive a control message from a further communication device of the plurality of communication devices, the control message indicating that the further communication device is within the coverage area of the cellular communication network;
   wherein the communication device is further configured to, upon reception of said control message, start listening for messages from further communication devices of the plurality of communication devices using a first frequency band;
   wherein the communication device is configured to, as long as the communication device does not receive the control message, communicate with the further communication devices using a communication frame having a first control channel format, the first control channel format offering only communication resources for an ad-hoc communication mode; and
   wherein the communication device is further configured to, upon reception of the control message, communicate with the further communication devices using a communication frame having a second control channel format, the second control channel format offering communication resources for an ad-hoc communication mode and a network assisted communication mode.

2. The communication device according to claim 1, wherein the communication device is configured to stop listening for messages using the first frequency band upon not receiving said control message from any of the plurality of communication devices for a predetermined amount of time.

3. The communication device according to claim 1, wherein the communication device is configured to keep listening for messages using the first frequency band as long as it periodically receives the control message from at least one further communication device within the coverage area of the cellular communication network.

4. The communication device according to claim 1, wherein the communication device comprises a first receiver for the second frequency band and a second receiver for the first frequency band and wherein the communication device is configured to switch on the second receiver, upon reception of the control message, to start listening for messages from further communication devices of the plurality of communication devices using the first frequency band.

5. The communication device of claim 1, wherein the communication device is configured to, when it is within the coverage area of the cellular communication network, use the first frequency band for cellular communication and device to device communication and when it is within an edge region of the coverage area further use the second frequency band for device to device communication only.

6. A method of operating a communication device outside a coverage area of a cellular communication network, configured to perform a device to device communication with a plurality of further communication devices using a second frequency band, wherein the method comprises:
   receiving a control message from a further communication device of the plurality of communication devices, the control message indicating that the further communication device is within the coverage area of a cellular communication network; and
   upon reception of the control message, starting to listen for messages from further communication devices of the plurality of communication devices using a first frequency band;
   wherein as long as the communication device does not receive the control message, communicating with the further communication devices using a communication frame having a first control channel format, the first control channel format offering only communication resources for an ad-hoc communication mode; and
   wherein upon reception of the control message, communicating with the further communication devices using a communication frame having a second control channel format, the second control channel format offering communication resources for an ad-hoc communication mode and a network assisted communication mode.

7. The method according to claim 6, further comprising stopping listening for messages using the first frequency band upon not receiving said control message from any of the plurality of communication devices for a predetermined amount of time.

8. The method according to claim 6, further comprising continuing listening for messages using the first frequency band as long as it periodically receives the control message from at least one further communication device within the coverage area of the cellular communication network.

9. The method according to claim 6, wherein the communication device comprises a first receiver for the second frequency band and a second receiver for the first frequency band, and wherein the method further comprises:
   switching on the second receiver, upon reception of the control message, to start listening for messages from further communication devices of the plurality of communication devices using the first frequency band.

10. The method according to claim 6, further comprising:
   when it is within the coverage area of the cellular communication network, using the first frequency band for cellular communication and device to device communication; and
   when it is within an edge region of the coverage area, using the second frequency band for device to device communication only.

11. A non-transitory machine-readable medium having instructions stored therein, which when executed by a processor, cause a processor perform a method of operating a communication device outside a coverage area of a cellular communication network, configured to perform a device to device communication with a plurality of further communication devices using a second frequency band, the method comprising:

receiving a control message from a further communication device of the plurality of communication devices, the control message indicating that the further communication device is within the coverage area of a cellular communication network; and     upon reception of the control message, starting to listen for messages from further communication devices of the plurality of communication devices using a first frequency band;

wherein as long as the communication device does not receive the control message, communicating with the further communication devices using a communication frame having a first control channel format, the first control channel format offering only communication resources for an ad-hoc communication mode; and     wherein upon reception of the control message, communicating with the further communication devices using a communication frame having a second control channel format, the second control channel format offering communication resources for an ad-hoc communication mode and a network assisted communication mode.

12. The machine-readable medium according to claim 11, wherein the method further comprises stopping listening for messages using the first frequency band upon not receiving said control message from any of the plurality of communication devices for a predetermined amount of time.

13. The machine-readable medium according to claim 11, wherein the method further comprises continuing listening for messages using the first frequency band as long as it periodically receives the control message from at least one further communication device within the coverage area of the cellular communication network.

14. The machine-readable medium according to claim 11, wherein the communication device comprises a first receiver for the second frequency band and a second receiver for the first frequency band, and wherein the method further comprises:

switching on the second receiver, upon reception of the control message, to start listening for messages from further communication devices of the plurality of communication devices using the first frequency band.

15. The machine-readable medium according to claim 11, wherein the method further comprises:

when it is within the coverage area of the cellular communication network, using the first frequency band for cellular communication and device to device communication; and     when it is within an edge region of the coverage area, using the second frequency band for device to device communication only.

\* \* \* \* \*